United States Patent
Sandberg et al.

(10) Patent No.: US 10,419,156 B2
(45) Date of Patent: Sep. 17, 2019

(54) SERVING NETWORK NODE AND METHOD FOR DETERMINING A TRANSMISSION PARAMETER TO BE USED FOR A TRANSMISSION TO A WIRELESS DEVICE

(71) Applicant: Telefonaktiebolaget LM Ericsson (publ), Stockholm (SE)

(72) Inventors: Sara Sandberg, Luleå (SE); Per Burström, Luleå (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 207 days.

(21) Appl. No.: 15/524,528

(22) PCT Filed: Nov. 4, 2014

(86) PCT No.: PCT/EP2014/073703
§ 371 (c)(1),
(2) Date: May 4, 2017

(87) PCT Pub. No.: WO2016/070909
PCT Pub. Date: May 12, 2016

(65) Prior Publication Data
US 2018/0278364 A1    Sep. 27, 2018

(51) Int. Cl.
*H04W 72/12* (2009.01)
*H04L 1/00* (2006.01)
(Continued)

(52) U.S. Cl.
CPC .......... *H04L 1/0003* (2013.01); *H04L 1/0009* (2013.01); *H04L 1/0026* (2013.01); *H04W 24/10* (2013.01); *H04W 28/18* (2013.01)

(58) Field of Classification Search
CPC .... H04W 24/10; H04W 28/18; H04L 1/0003; H04L 1/0026; H04L 1/0009
See application file for complete search history.

(56) References Cited

U.S. PATENT DOCUMENTS

| 9,055,478 B2 * | 6/2015 | Goldhamer | ........... H04W 24/10 |
| 10,014,911 B2 * | 7/2018 | Marinier | ................ H04B 7/024 |

(Continued)

FOREIGN PATENT DOCUMENTS

| WO | 2007044281 A1 | 4/2007 |
| WO | 2008024773 A2 | 2/2008 |

OTHER PUBLICATIONS

International Search Report and Written Opinion dated Jul. 3, 2015 for International Application Serial No. PCT/EP2014/073703, International Filing Date: Nov. 4, 2014 consisting of 8 pages.

*Primary Examiner* — Lan-Huong Truong
(74) *Attorney, Agent, or Firm* — Patent Portfolio Builders, PLLC (57) ABSTRACT

A network node and a method for determining a transmission parameter for a transmission to a wireless device. (i) path gain information relating to the wireless device, or (ii) downlink received power relating to Cell-specific Reference Signal(s), CRS(s), transmitted by at least the serving network node, and load information of network nodes that are potentially strong interferers to the wireless device are obtained. A Channel State Information, CSI, report is received from the wireless device, and a CQI offset is determined using (i) the obtained path gain information or (ii) the downlink received power, and the obtained load information. The CQI offset is the difference between a Signal to Interference and Noise Ratio, SINR, for a data signal and an SINR for a CRS. The transmission parameter is based on the reported CSI and CQI offset.

17 Claims, 5 Drawing Sheets

(51) Int. Cl.
*H04W 28/18* (2009.01)
*H04W 24/10* (2009.01)

(56) References Cited

U.S. PATENT DOCUMENTS

| | | | | |
|---|---|---|---|---|
| 2007/0097931 A1* | 5/2007 | Parekh | H04W 56/00 | 370/338 |
| 2011/0250919 A1* | 10/2011 | Barbieri | H04L 1/0026 | 455/509 |
| 2013/0028345 A1* | 1/2013 | Ko | H04B 7/063 | 375/267 |
| 2013/0094388 A1* | 4/2013 | Furuskar | H04L 1/0026 | 370/252 |
| 2013/0194940 A1* | 8/2013 | Li | H04J 11/0023 | 370/252 |
| 2014/0314000 A1* | 10/2014 | Liu | H04W 72/042 | 370/329 |
| 2016/0037550 A1* | 2/2016 | Barabell | H04B 17/318 | 455/450 |

* cited by examiner

404 Receiving unit

SERVING NETWORK NODE AND METHOD FOR DETERMINING A TRANSMISSION PARAMETER TO BE USED FOR A TRANSMISSION TO A WIRELESS DEVICE

CROSS-REFERENCE TO RELATED APPLICATIONS

This Application is a Submission Under 35 U.S.C. § 371 for U.S. National Stage Patent Application of International Application No. PCT/EP2014/073703, filed Nov. 4, 2014 entitled "SERVING NETWORK NODE AND METHOD FOR DETERMINING A TRANSMISSION PARAMETER TO BE USED FOR A TRANSMISSION TO A WIRELESS DEVICE," the entirety of which is incorporated herein by reference.

TECHNICAL FIELD

The present disclosure relates to wireless communication and in particular to a network node and a method performed by the network node for determining a transmission parameter to be used for a transmission to a wireless device.

BACKGROUND

In wireless communication networks, users of communication devices typically move around with their communication device(s), hereinafter referred to as wireless device(s). Some non-limiting examples of a wireless device are a User equipment, UE, a Personal Digital Assistant, PDA, a laptop, or any other apparatus such as e.g. a vehicle comprising communication means for communicating with a node or entity of the wireless communication network.

As the locations of the wireless devices change, so do the radio conditions as the path between the wireless device and a serving network node changes. Further, the number of different wireless devices currently being served by, or connected to, the serving network node changes irregularly.

In order to cope with the constantly changing radio conditions, the serving network node has several options and functions in order to try to keep the quality of each radio channel between itself and a respective wireless device to be as good as possible, or at least good enough to fulfil some quality of service requirements.

One example of a function to improve, or keep, the channel quality to an acceptable level is link adaptation, LA. In order to enable link adaptation, a wireless device measures on downlink reference symbols transmitted by network nodes and predicts best rank and Modulation and Coding Scheme, MCS, which is an example of a transmission parameter. The wireless device may further suggest a precoder. Proposed rank is reported as Rank Indicator, RI, and proposed MCS as Channel Quality Indicator, CQI.

The CQI may be noisy and can be more or less outdated when used in the serving network node for MCS selection. An outer-loop is used to adapt to the impact of this and compensate for channel changes and movement of the wireless device. The outer-loop is typically a Block Error Rate, BLER,-based jump algorithm that targets a certain Hybrid Automatic Repeat Request, HARQ, BLER, e.g. 10%, adjusting with a margin in dB for the CQI inaccuracy. The adjustment is thus continuously updated as long as the wireless device is scheduled in the downlink, and becomes higher if one or more ACKs are received, and lower if the wireless device reports one or more NACKs. The outer-loop also adapts to other measurement noise such as wireless device vendor implementation differences and measurement errors.

Figure 1:
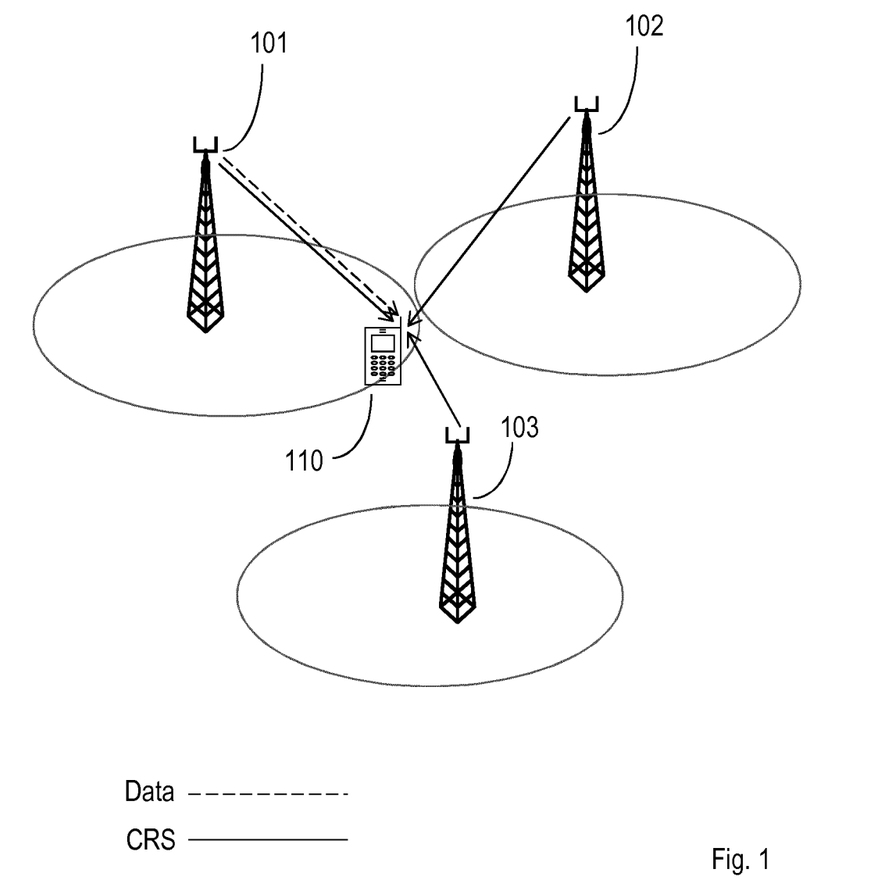
FIG. 1 is a schematic illustration of a possible interference situation for a wireless device with regards to transmitted CRS(s) from a plurality of network nodes.

Networks using Transmission Mode 4, TM4, and colliding Cell Specific Reference Signals, CRSs, are not unlikely to continue to be important in the future, due to the lower complexity compared to e.g. TM10. Legacy wireless device using TM4 and colliding CRSs will also continue to exist for a long time due to the slow turnover time to change the existing wireless device population base. However, for TM4, most wireless device vendor implementations estimate the interference based on CRSs, which can result in a large interference estimation bias at low load. Interference estimation based on CRSs can be seen as always estimating the interference as coming from fully loaded neighbouring cells since CRSs are always transmitted, even if there is no data to transmit, see FIG. 1. The large interference bias may occur in any system where the CSI information is based on colliding CRSs, e.g. TM4 and TM9. See also FIG. 1.

For non-colliding CRSs, the interference estimation bias is generally much smaller since an interference measurement on a CRS resource captures Physical Downlink Shared Channel, PDSCH, transmissions from the surrounding network nodes with different CRS shift. However, colliding CRSs are typically preferred since non-colliding CRSs cause interference to the PDSCH transmissions.

Currently, the interference bias is often left for the outer loop LA to handle, but a more preferable solution to the problem with interference estimation bias is coordinated link adaptation. In a coordinated cluster, the serving network node may have knowledge about the PDSCH scheduling and may determine the interference based on if interfering network nodes are currently transmitting and the estimated received power of the interference.

The outer loop usually requires operation in small increments for stability reasons. It can take a long time to converge towards a proper adjustment if the raw reported CQI is not an accurate representation of the channel quality for demodulation, which is the case when the CSI information is based on colliding CRSs due to the interference estimation bias at low load. The difference between SINR based on CRS and SINR for demodulation may also change due to mobility or when the wireless device is in DTX for a longer period, which means the CQI adjustment stored in the serving network node will represent an outdated bias compensation that may not be suitable for the radio conditions.

Coordinated link adaptation requires a very good backhaul between the coordinated network nodes and a considerable study and implementation effort for it to work.

SUMMARY

The object is to obviate at least some of the problems outlined above. In particular, it is an object to provide a network node and a method performed thereby for determining a transmission parameter to be used for a transmission to a wireless device. These objects and others may be obtained by providing a serving network node and a method performed by a serving network node according to the independent claims attached below.

According to an aspect a method performed by a serving network node for determining a transmission parameter to be used for a transmission to a wireless device is provided. The method comprises obtaining (i) path gain information relating to the wireless device, or (ii) downlink received power relating to CRS(s) transmitted by at least the serving network node; and obtaining load information of network nodes that are potentially strong interferers to the wireless device, The method comprises receiving a Channel State Information, CSI, report from the wireless device; and determining a CQI offset based on (i) the obtained path gain information or (ii) the downlink received power, and the obtained load information, wherein the CQI offset is determined as the difference between a Signal to Interference and Noise Ratio, SINR for a data signal and an SINR for a CRS. Still further, the method comprises determining 250 the transmission parameter to be used for the transmission to the wireless device based on the reported CSI and determined CQI offset.

According to an aspect a serving network node for determining a transmission parameter to be used for a transmission to a wireless device is provided. The serving network node is configured for obtaining (i) path gain information relating to the wireless device, or (ii) downlink received power relating to Cell-specific Reference Signal(s), CRS(s), transmitted by at least the serving network node; and for obtaining load information of network nodes that are potentially strong interferers to the wireless device. The serving network node further is configured for receiving a Channel State Information, CSI, report from the wireless device; and for determining a CQI offset based on (i) the obtained path gain information or (ii) the downlink received power, and the obtained load information, wherein the CQI offset is determined as the difference between a Signal to Interference and Noise Ratio, SINR for a data signal and an SINR for a CRS. Still further, the serving network node is configured for determining the transmission parameter to be used for the transmission to the wireless device based on the reported CSI and determined CQI offset.

The serving network node and the method performed by the serving network node may have several possible advantages. A possible advantage is that the outer-loop CQI adjustment accuracy may be improved by compensating for interference bias in the wireless device specific manner including variations over time. The selection of transmission parameters, e.g. an MCS, is a trade-off between the probability that a transmission can be received and decoded by the terminal given the radio conditions and the amount of user data bits transmitted per time unit.

BRIEF DESCRIPTION OF DRAWINGS

Embodiments will now be described in more detail in relation to the accompanying drawings, in which.

DETAILED DESCRIPTION

Briefly described, a network node and method performed by the network node for determining a transmission parameter to be used for a transmission to a wireless device are provided. Instead of using a received raw CQI from the wireless device, the serving network node applies a CQI offset when determining the transmission parameter to be used for a transmission to a wireless device.

By the CQI offset, a more accurate CQI that accounts for the interference estimation bias caused when CSI information is based on colliding CRSs as is the case in e.g. TM4 and TM9, particularly at low load, may be obtained. With accurate CQI information, the link adaptation may work properly and system throughput may be improved.

The CQI offset is selected based on estimates of a wideband interference impact measure, commonly referred to as "geometry", of surrounding network nodes, and a load metric which is estimated in or communicated to the serving network node. The interference impact estimates may e.g. be based on RSRP measurements reported from the wireless device or on SRS measurements from surrounding network nodes. The solution in this disclosure makes use of both the CRS-based Signal to Interference and Noise Ratio, SINR, experienced on CRS and accounted for in the reported CQI, and an estimate of the SINR representative of the actual PDSCH interference, and selects the CQI offset as the difference between these.

Embodiments of such a method performed by a serving network node for determining a transmission parameter to be used for a transmission to a wireless device will now be described with reference to FIG. 2a.

Figure 2A:
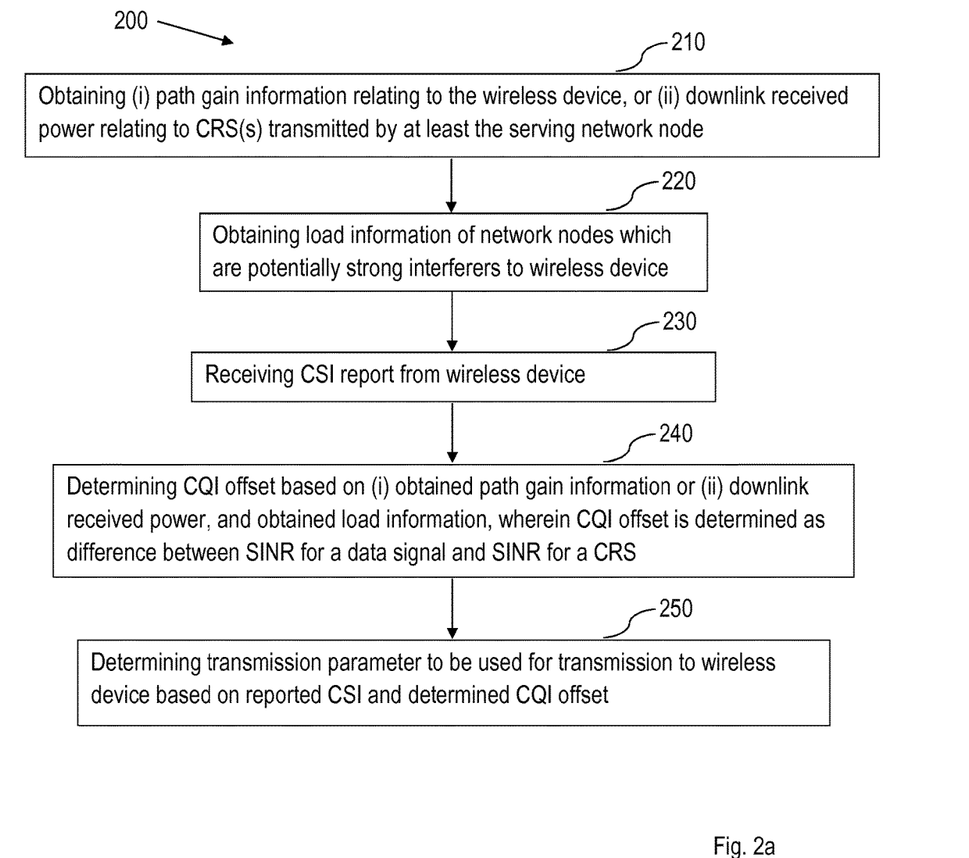
FIG. 2a is a flowchart of a method performed by a serving network node for determining a transmission parameter to be used for a transmission to a wireless device according to an exemplifying embodiment.

FIG. 2a illustrates the method 200 comprising obtaining 210 (i) path gain information relating to the wireless device, or (ii) downlink received power relating to Cell-specific Reference Signal(s), CRS(s), transmitted by at least the serving network node; and obtaining 220 load information of network nodes that are potentially strong interferers to the wireless device. The method comprises receiving 230 a Channel State Information, CSI, report from the wireless device; and determining 240 a CQI offset based on (i) the obtained path gain information or (ii) the downlink received power, and the obtained load information, wherein the CQI offset is determined as the difference between a Signal to Interference and Noise Ratio, SINR for a data signal and an SINR for a CRS. Still further, the method comprises determining 250 the transmission parameter to be used for the transmission to the wireless device based on the reported CSI and determined CQI offset.

The serving network node receives different measurement reports from wireless devices being served by, or connected to, the serving network node. The serving network node may also communicate with other network nodes and exchange various types of information, e.g. by means of an X2 protocol in case the network nodes are employed in a wireless communication network based on Long Term Evolution, LTE, technology. Examples of information exchanged between nodes in this disclosure are downlink transmission powers and estimated uplink received powers from measurements made on SRS transmissions.

Both the (i) path gain information and the (ii) downlink received power relating to CRS(s) transmitted by at least the serving network node may be obtained in various ways as will be explained in more detail below.

Depending on the network technology, the serving network node may communicate with other network nodes in different ways. As exemplified above, in an LTE based wireless communication network, the serving network node may communicate "directly" with other network nodes by means of the X2 protocol. Alternatively, the serving network node may communicate with, or obtain information relating to, other network nodes by means of e.g. a base station controller or a radio network controller. Hence, the serving network node may obtain 220 load information of network nodes that are potentially strong interferers to the wireless device either directly from those network nodes or by means of e.g. a base station controller, a radio network controller or a centralised node such as e.g. a Mobility Management Entity, MME.

An example of the different measurement reports that the serving network node may receive is the CSI report. In LTE, employing shared-channel transmissions, the overall time-frequency resource is dynamically shared between users, i.e. wireless devices. The resource requirements and conditions may vary rapidly, and in order for the network node to adapt downlink transmissions to the current resource requirements and conditions, the wireless devices may perform different measurements on received downlink transmissions. One example of measuring and reporting the instantaneous downlink channel quality is by measuring on received CRS and send the measurement results in a measurement report. The CSI report provides the serving network node with information pertaining to the instantaneous downlink channel quality, wherein the serving network node may assign resources for downlink transmission to different wireless devices, taking the channel quality into account in a scheduling decision. The CSI report generally comprises a CQI, a Precoding Matrix Indicator, PMI, and a Rank Indicator, RI. The CQI may represent the highest modulation and coding scheme, MCS, which if used, would mean a downlink transmission using the recommended RI and OMI would be received with a block error probability of at most 10%. However, since the measurement was made on colliding CRS, the CSI report is inherently more or less biased and the suggested set of transmission parameters may be a poor choice compared to what the channel actually supports.

The method further comprises determining 240 the CQI offset, wherein the CQI offset is determined as the difference between an estimated Signal to Interference and Noise Ratio, SINR for a data signal and an estimated SINR for a CRS.

The serving network node determines 240 the CQI offset, $\Delta$CQI, based on (i) the obtained path gain information or (ii) the downlink received power and the obtained load information. By adding the offset to the reported CQI, the bias between the reported CQI and actual Physical Downlink Shared Channel SINR may be reduced. In this disclosure, the CQI offset is determined as the difference between an estimated SINR for the data signal and an estimated SINR for the CRS, i.e. $\Delta CQI = SINR_{PDSCH} - SINR_{CRS}$. The SINR for the data signal may be calculated using the downlink received power and the loads. An alternative is to use path gain info, transmit powers and the loads. This will be explained in more detail below.

Once the serving network node has determined the CQI offset, the serving network node determines 250 the transmission parameter to be used for the transmission to the wireless device based on the reported CSI and the determined CQI offset.

The method performed by the network node may have several advantages. A possible advantage is that the outer loop CQI adjustment accuracy may be improved by compensating for interference bias in the wireless device in a specific manner including variations over time.

According to an embodiment, obtaining 210 (i) path gain information relating to the wireless device, or (ii) downlink received power relating to CRS(s) transmitted by at least the serving network node, comprises receiving a Reference Signal Received Power, RSRP, report from the wireless device, where the report indicates both a set of network nodes, including the serving network node, whose downlink reference signal transmissions, i.e. transmitted CRSs, are received with powers above a threshold, as well as the measured received power values relating to CRS(s) transmitted by the network nodes in this set, and, based on the information in the RSRP report, calculating the respective path gains associated with the network nodes in the set for the wireless device, wherein the calculation of path gains is based on the information exchanged in the network of CRS transmit powers used by the respective network nodes in the set.

By the RSRP report, the serving network node receives information about which network nodes the wireless device can receive. The wireless device may receive e.g. CRSs transmitted from the serving network node and at least one other network node. The wireless device receives these respective CRSs with a respective signal strength, or received power, that the wireless device measures. The wireless device compiles a report to the serving network node, the report comprising information about which network nodes the wireless device can receive CRSs from, and with what signal strength these respective CRSs are received. The wireless device may report all network nodes it receives CRSs from, or only report those network nodes whose CRSs are received by the wireless device having a signal strength above a specified threshold. The threshold may be absolute or, typically, set in relation to the strength of the strongest received node's CRSs. The reason for only reporting CRSs being received above a threshold may be that only such CRSs may cause significant interference to the wireless device, and hence the network node(s) that transmitted those CRSs are then potentially strong interferers.

The serving network node may then determine, thus obtaining, (i) path gain information relating to the wireless device, or (ii) downlink received power relating to CRS(s) transmitted by at least the serving network node using the information in the received RSRP report, the information pertaining to which network nodes the wireless device can receive and with which respective signal strength the wireless device has received the respective CRSs. The serving network node thus calculates the respective path gains associated with the network nodes in the set for the wireless device, wherein the calculation of path gains is based on the CRS transmit powers used by the respective network nodes in the set.

The serving network node has information which transmission power was used for transmitting the CRSs of the serving network node. The serving network node may obtain the respective transmission power of the network nodes in the set of network nodes that are potentially strong interferers. In an example, each network node transmits its CRS at a network-wide nominal transmission power, wherein the CRS transmit power is the same for all network nodes and thus known to the serving network node. In another example, any network node may apply a power boost to the transmission power of its CRS(s) and if so, the network node needs to know the individual CRS transmission power of the network nodes comprised in the set of network nodes that are potentially strong interferers. By knowing the individual CRS transmission power(s) and the signal strength with which the individual CRS(s) were received by the network node, the serving network node may calculate the respective path gain for the wireless device with regards to the network nodes in the set of network nodes that are potentially strong interferers.

Obtaining 210 path gain information relating to the wireless device may comprise estimating the path gain to the wireless device based on a received power measured on an uplink Sounding Reference Signal, SRS, transmitted from the wireless device, and further comprises receiving, from network nodes that are potentially strong interferers to the wireless device, received power measurements made in the respective network nodes on said transmitted uplink SRS.

The wireless device transmits SRS(s) on the uplink to allow for network nodes to estimate the uplink channel state at different frequencies. The channel state estimates may then be used, e.g. by a scheduler of the network node, to assign resource blocks of instantaneously good quality for uplink Physical Uplink Shared Channel, PUSCH, transmission from the wireless device as well as to select different transmission parameters related to uplink transmission. Just as the wireless device may receive CRSs transmitted from both the serving network node as at least one other network node, the SRS(s) may be received by one or more network nodes in addition to the serving network node for which the SRS was intended.

The serving network node knows which transmission power the wireless device used to transmit the SRS. The serving network node may receive information from other network nodes concerning the signal strength with which the other network nodes received the SRS. As explained above, the serving network node may for example communicate with the other network nodes by means of an X2 interface or via e.g. a radio network controller or MME.

Knowing the transmission power the wireless device used to transmit the SRS and the respective signal strength with which the respective network nodes received the SRS, a respective path gain may be determined for those network nodes that are in the set of network nodes that are potentially strong interferers.

In an example, load information indicates a respective average load of the respective network nodes that are potentially strong interferers to the wireless device.

Load information may be instantaneous or a respective average load. Since the load may vary quickly, an average load may be used in order to calculate a more stable CQI offset.

The network nodes may communicate with each other using the X2 protocol, wherein the serving network node may obtain the load information indicating the average load of the respective network nodes that are potentially strong interferers to the wireless device. In another example, the serving network node receives the information from a centralised node or processor or the MME.

The method may further comprise determining 215 downlink received power relating to the wireless device, wherein the wideband SINR for the CRS, a measure known as the "geometry", is determined as downlink received power at the wireless device with regards to the CRS(s) transmitted by serving network node divided by a sum of the respective downlink received powers at the wireless device with regards to the CRS(s) transmitted by the network nodes being potentially strong interferers to the wireless device.

This may be expressed as $$SINR_{CRS} = \frac{P_i * g_i}{\Sigma_{j \neq i} P_j * g_j}.$$

In this equation, $P_i$ is the transmission power by means of which the serving network node transmitted the CRS, and $g_i$ is the path gain with respect to the wireless device. Consequently, $P_i*g_i$ corresponds to downlink received power at the wireless device with regards to the CRS(s) transmitted by serving network node. Similarly, for each network node j, that is a potentially strong interferer to the wireless device, the $P_j$ is the transmission power by means of which the potentially strong interferer j transmitted the CRS and $g_j$ is the respective path gain with respect to the potentially strong interferer j and the wireless device.

The wireless device may receive CRS(s) transmitted by both the serving network node and other network nodes as described above. Since the CQI offset, $\Delta$CQI, is determined as the difference between the SINR for the data signal and an SINR for the CRS, i.e. $\Delta$CQI=$SINR_{PDSCH}$-$SINR_{CRS}$, the serving network node also needs to determine the SINR for the PDSCH, i.e. $SINR_{PDSCH}$.

Still further, the method may comprise determining 215 downlink received power relating to the wireless device, wherein the SINR for the data signal is determined as downlink received power at the wireless device with regards to the CRS(s) transmitted by the serving network node divided by a sum of the respective downlink received powers at the wireless device with regards to the CRS(s) transmitted by the network nodes that are potentially strong interferers to the wireless device multiplied with the respective load indicators and the CRS power boosting offsets of said network nodes.

The serving network node is in possession of the relevant information pertaining to about which network nodes the wireless device can receive, i.e. which network nodes the wireless device receives CRS(s) from and with which signal strength the wireless device receives the respective CRS(s).

As described above, the serving network node also obtains load information of network nodes that are potentially strong interferers to the wireless device, wherein the load information can be an average load.

The serving network node also obtains the transmission power by means of which respective potentially strong interferer transmitted, or transmits, its CRS(s). It may be that the CRS(s) are transmitted at nominal transmission power or using a CRS power boosting.

Thus, when the serving network node determines downlink SINR relating to the data channel of the wireless device, the network node may divide downlink received power at the wireless device with regards to the CRS(s) transmitted by the serving network node by the sum of the respective downlink received powers at the wireless device with regards to the CRS(s) transmitted by the network nodes that are potentially strong interferers to the wireless device multiplied with the respective load indicators and the CRS power boosting offsets of the network nodes, if such CRS power boosting offsets were used.

This may be expressed as $$SINR_{PDSCH} = \frac{P_i * g_i * K_i}{\Sigma_{j \neq i} L_j * P_j * g_j * K_j}.$$

In this equation, $P_i$ is the transmission power by means of which the serving network node transmitted the CRS, $g_i$ is the path gain with respect to the wireless device, and $K_i$ is the ratio between transmit power on data symbols to transmit power on CRS for serving node i. Consequently, $P_i*g_i*K_i$ corresponds to downlink received power at the wireless device with regards to the data transmitted by the serving network node. Similarly, for each network node j, that is a potentially strong interferer to the wireless device, the $P_j$ is the transmission power by means of which the potentially strong interferer j transmitted the CRS, $g_j$ is the respective path gain with respect to the potentially strong interferer j and the wireless device, and $K_j$ is the ratio between transmit power on data symbols to transmit power on CRS for interfering node j. $L_j$ is the average load of potentially strong interferer j, and the measure $SINR_{PDSCH}$ is subsequently a load-weighted geometry.

Consequently, the load-weighted geometry weights the impact of a potentially strong interferer j with a measure of the load that can be filtered over time, according to the traffic type and latency of the backhaul network. The difference between this solution and fast coordinated link adaptation is that the calculation of $SINR_{PDSCH}$ here is based on an average load communicated between network nodes, while fast coordinated link adaptation requires communication of scheduling decisions between network nodes for every Transmission Time Interval, TTI.

In an example, the method further comprises tuning the CQI offset with a correction factor.

By tuning the CQI offset, possible impacts of a difference in actual versus full load geometries may be scaled. This may be expressed as $SINR_{LA}=SiNR_{CQI}+\Omega*\Delta CQI$, where $\Delta CQI=SINR_{PDSCH}-SINR_{CRS}$, as described above.

In another example, the method further comprises tuning the CQI offset by adding a rank-specific offset to the CQI offset.

The rank-specific offset may be added to the CQI offset to take height for possibly increased difficulty of doing interference suppression for higher rank transmissions.

The value of rank-specific offset depends on the rank, or rank information, RI.

Figure 2B:
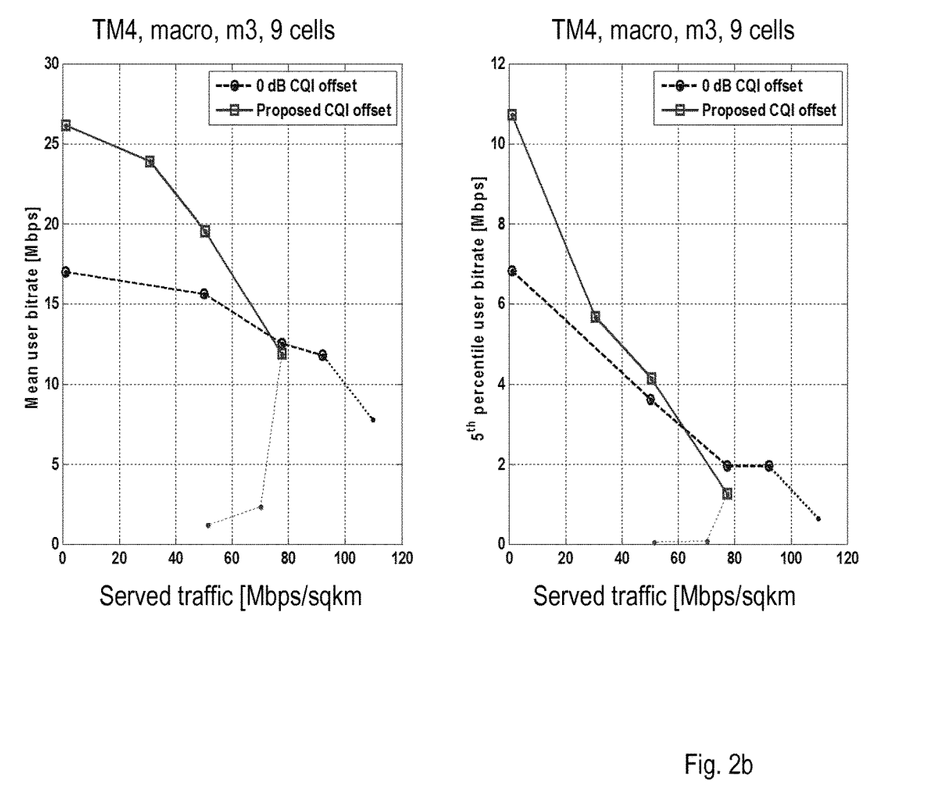
FIG. 2b is an illustration of a simulation of a mean user bitrate as a function of served traffic with and without the solution outlined in this disclosure.

A difference between initialising the Link Adaptation SINR with raw CQI (0 dB CQI offset) and embodiments of the proposed solution is shown for a system level file download evaluation with 100 kB file sizes in a non-shifted TM4 network in FIG. 2b. For relatively low loads, the embodiments disclosed herein significantly increases throughput of the wireless device by improving the SINR used for link adaptation by taking the load and interference strength of potentially strong interferers into account. The decrease in performance at very high load is due to the tendency for the algorithm to overestimate SINR in case the actual and full load geometry happens to differ at certain time instants. At high load, the algorithm would not be used and the default 0 dB offset is usually a good adjustment. In other words, the method described above is applicable mostly for low load scenarios.

Embodiments herein also relate to a serving network node for determining a transmission parameter to be used for a transmission to a wireless device. The network node has the same objects, technical features and advantages as the method performed by the network node as described above. The network node will only be described in brief in order to avoid unnecessary repetition FIGS. 3 and 4 are block diagrams of a serving network node 400, 600 for determining a transmission parameter to be used for a transmission to a wireless device.

Figure 3:
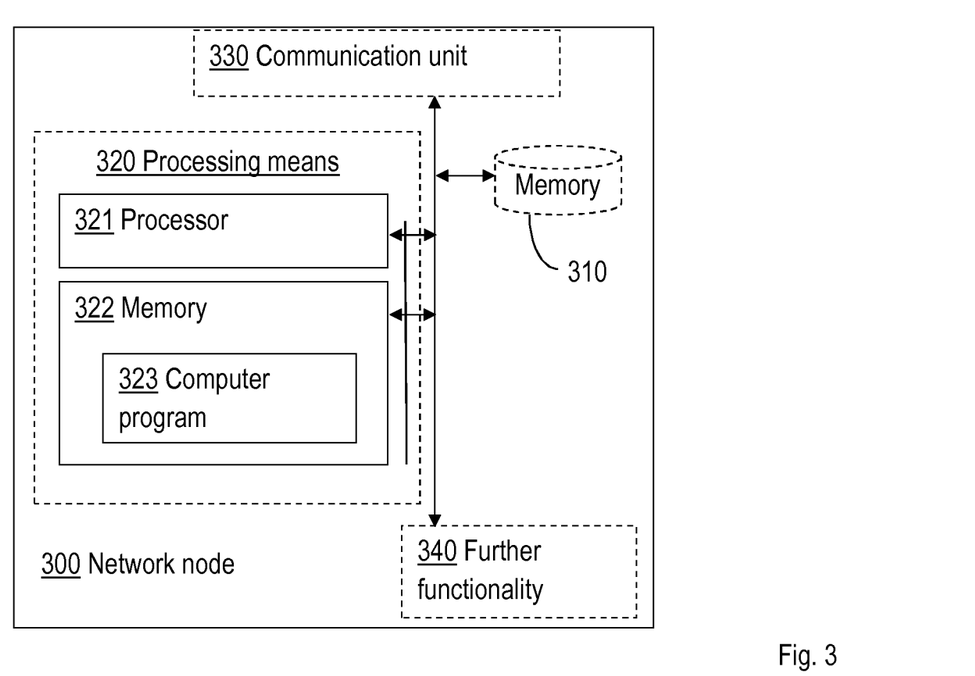
FIG. 3 is a block diagram of a serving network node for determining a transmission parameter to be used for a transmission to a wireless device according to an exemplifying embodiment.
Figure 4:
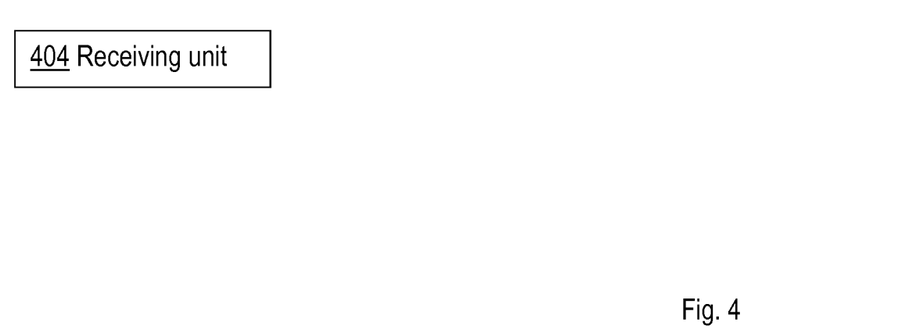
FIG. 4 is a block diagram of a serving network node for determining a transmission parameter to be used for a transmission to a wireless device according to another exemplifying embodiment.

FIGS. 3 and 4 illustrate the serving network node 300, 400 configured for obtaining (i) path gain information relating to the wireless device, or (ii) downlink received power relating to Cell-specific Reference Signal(s), CRS(s), transmitted by at least the serving network node; and for obtaining load information of network nodes that are potentially strong interferers to the wireless device. The serving network node 300, 400 further is configured for receiving a Channel State Information, CSI, report from the wireless device; and for determining a CQI offset based on (i) the obtained path gain information or (ii) the downlink received power, and the obtained load information, wherein the CQI offset is determined as the difference between a Signal to Interference and Noise Ratio, SINR for a data signal and an SINR for a CRS. Still further, the serving network node 300, 400 is configured for determining the transmission parameter to be used for the transmission to the wireless device based on the reported CSI and determined CQI offset.

The serving network node 300, 400 may be implemented or realised in different ways. An exemplifying implementation is illustrated in FIG. 3. FIG. 3 illustrates the network node 300 comprising a processor 321 and memory 322, the memory comprising instructions, e.g. by means of a computer program 323, which when executed by the processor 321 causes the network node 300 to obtain (i) path gain information relating to the wireless device, or (ii) downlink received power relating to Cell-specific Reference Signal(s), CRS(s), transmitted by at least the serving network node; and to obtain load information of network nodes that are potentially strong interferers to the wireless device. The memory 322 further comprising instructions, e.g. by means of a computer program 323, which when executed by the processor 321 causes the network node 300 to receive a Channel State Information, CSI, report from the wireless device; and to determine a CQI offset based on (i) the obtained path gain information or (ii) the downlink received power, and the obtained load information, wherein the CQI offset is determined as the difference between a Signal to Interference and Noise Ratio, SINR for a data signal and an SINR for a CRS. Still further, the memory 322 comprising instructions, e.g. by means of a computer program 323, which when executed by the processor 321 causes the network node 300 to determine the transmission parameter to be used for the transmission to the wireless device based on the reported CSI and determined CQI offset.

FIG. 3 also illustrates the serving network node 300 comprising a memory 310. It shall be pointed out that FIG. 3 is merely an exemplifying illustration and memory 310 may be optional, be a part of the memory 322 or be a further memory of the serving network node. The memory may for example comprise information relating to the network node 300, to statistics of operation of the serving network node 300, just to give a couple of illustrating examples. FIG. 3 further illustrates the serving network node 300 comprising processing means 320, which comprises the memory 322 and the processor 321. Still further, FIG. 3 illustrates the network node 300 comprising a communication unit 330. The communication unit 330 may comprise an interface through which the serving network node 300 communicates with other nodes or entities of the communication network as well as wireless device of the communication network. FIG. 3 also illustrates the serving network node 300 comprising further functionality 340. The further functionality 340 may comprise hardware of software necessary for the serving network node 300 to perform different tasks that are not disclosed herein. Merely as an illustrative example, the further functionality may comprise a scheduler for scheduling transmissions from the serving network node 300 and/or for transmissions from wireless devices with which the serving network node 300 communicates with.

An alternative exemplifying implementation of the network node 300, 400 is illustrated in FIG. 4. FIG. 4 illustrates the network node 400 comprising an obtaining unit 403 for obtaining (i) path gain information relating to the wireless device, or (ii) downlink received power relating to Cell-specific Reference Signal(s), CRS(s), transmitted by at least the serving network node; and for obtaining load information of network nodes that are potentially strong interferers to the wireless device. The network node 400 further comprises a receiving unit 404 for receiving a Channel State Information, CSI, report from the wireless device. The network node 400 further comprises a determining unit 405 for determining a CQI offset based on (i) the obtained path gain information or (ii) the downlink received power, and the obtained load information, wherein the CQI offset is determined as the difference between a Signal to Interference and Noise Ratio, SINR for a data signal and an SINR for a CRS; and for determining the transmission parameter to be used for the transmission to the wireless device based on the reported CSI and determined CQI offset.

In FIG. 4, the serving network node 400 is also illustrated comprising a communication unit 401. Through this unit, the serving network node 400 is adapted to communicate with other nodes and/or entities in the wireless communication network. The communication unit 401 may comprise more than one receiving arrangement. For example, the communication unit 401 may be connected to both a wire and an antenna, by means of which the serving network node 400 is enabled to communicate with other nodes and/or entities in the wireless communication network. Similarly, the communication unit 401 may comprise more than one transmitting arrangement, which in turn are connected to both a wire and an antenna, by means of which the serving network node 400 is enabled to communicate with other nodes and/or entities in the wireless communication network. The serving network node 400 further comprises a memory 402 for storing data. Further, the serving network node 400 may comprise a control or processing unit (not shown) which in turn is connected to the different units 403-405. It shall be pointed out that this is merely an illustrative example and the serving network node 400 may comprise more, less or other units or modules which execute the functions of the serving network node 400 in the same manner as the units illustrated in FIG. 4.

FIG. 4 also illustrates the serving network node 400 comprising further functionality 409. The further functionality 409 may comprise hardware or software necessary for the serving network node 400 to perform different tasks that are not disclosed herein. Merely as an illustrative example, the further functionality may comprise a scheduler for scheduling transmissions from the serving network node 400 and/or for transmissions from wireless devices with which the serving network node 400 communicates with.

It should be noted that FIG. 4 merely illustrates various functional units in the serving network node 400 in a logical sense. The functions in practice may be implemented using any suitable software and hardware means/circuits etc. Thus, the embodiments are generally not limited to the shown structures of the serving network node 400 and the functional units. Hence, the previously described exemplary embodiments may be realised in many ways. For example, one embodiment includes a computer-readable medium having instructions stored thereon that are executable by the control or processing unit for executing the method steps in the serving network node 400. The instructions executable by the computing system and stored on the computer-readable medium perform the method steps of the serving network node 400 as set forth in the claims.

The network node has the same plurality of possible advantages. A possible advantage is the outer-loop CQI adjustment accuracy may be improved by compensating for interference bias in the wireless device specific manner including variations over time.

According to an embodiment, the network node 300, 400 is configured for obtaining (i) path gain information relating to the wireless device, or (ii) downlink received power relating to CRS(s) transmitted by at least the serving network node by receiving a Reference Signal Received Power, RSRP, report from the wireless device indicating both a set of network nodes, including the serving network node, whose downlink reference signal transmissions, i.e. transmitted CRSs, are received with powers above a threshold, as well as the measured received power values relating to CRS(s9 transmitted by the network nodes in the set, and, based on these, calculating the respective path gains associated with the network nodes in the set for the wireless device, wherein the calculation of path gains is based on the CRS transmit powers used by the respective network nodes in the set.

According to yet an embodiment, the network node 300, 400 is configured for obtaining path gain information relating to the wireless device by estimating the path gain to the wireless device based on a received power measured on an uplink Sounding Reference Signal, SRS, transmitted from the wireless device, and further comprises receiving, from network nodes that are potentially strong interferers to the wireless device, received power measurements made in the respective network nodes on said transmitted uplink SRS.

According to still an embodiment, load information indicates a respective average load of the respective network nodes that are potentially strong interferers to the wireless device.

According to another embodiment, the network node 300, 400 is configured for determining 215 downlink received power relating to the wireless device, wherein the SINR for the CRS is determined as downlink received power at the wireless device with regards to the CRS(s) transmitted by serving network node divided by a sum of the respective downlink received powers at the wireless device with regards to the CRS(s) transmitted by the network nodes being potentially strong interferers to the wireless device.

According to yet an embodiment, the network node 300, 400 is configured for determining 215 downlink received power relating to the wireless device, wherein the SINR for the data signal is determined as downlink received power at the wireless device with regards to the CRS(s) transmitted by the serving network node divided by a sum of the respective downlink received powers at the wireless device with regards to the CRS(s) transmitted by the network nodes that are potentially strong interferers to the wireless device multiplied with the respective load indicators and the CRS power boosting offsets of said network nodes.

According to still an embodiment, the network node (300, 400) is further configured for tuning the CQI offset with a correction factor.

According to another embodiment, the serving network node 300, 400 is further configured for tuning the CQI offset by adding a rank-specific offset to the CQI offset.

Figure 5:
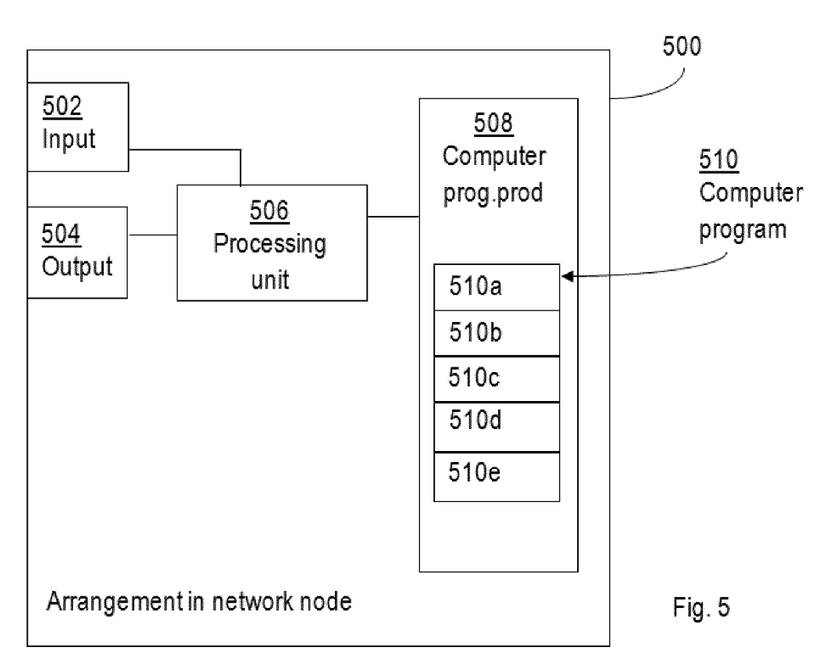
FIG. 5 is a block diagram of an arrangement in a serving network node for determining a transmission parameter to be used for a transmission to a wireless device according to an exemplifying embodiment.

FIG. 5 is a block diagram of an arrangement in a serving network node for determining a transmission parameter to be used for a transmission to a wireless device according to an embodiment.

Comprised in the arrangement 500 in the serving network node are here a processing unit 506, e.g. with a Digital Signal Processor, DSP. The processing unit 506 may be a single unit or a plurality of units to perform different actions of procedures described herein. The arrangement 500 in the serving network node may also comprise an input unit 502 for receiving signals from other entities, and an output unit 504 for providing signal(s) to other entities. The input unit and the output unit may be arranged as an integrated entity or as illustrated in the example of FIG. 4, as one or more interfaces 401.

Furthermore, the arrangement 500 in the serving network node comprises at least one computer program product 508 in the form of a non-volatile memory, e.g. an Electrically Erasable Programmable Read-Only Memory, EEPROM, a flash memory and a hard drive. The computer program product 508 comprises a computer program 510, which comprises code means, which when executed in the processing unit 506 in the arrangement 500 in the serving network node causes the serving network node to perform the actions e.g. of the procedure described earlier in conjunction with FIG. 2a.

The computer program 510 may be configured as a computer program code structured in computer program modules 510a-510e. Hence, in an exemplifying embodiment, the code means in the computer program of the arrangement 500 of the serving network node comprises an obtaining unit, or module, for obtaining (i) path gain information relating to the wireless device, or (ii) downlink received power relating to CRS(s) transmitted by at least the serving network node, and for obtaining load information of network nodes that are potentially strong interferers to the wireless device. The computer program further comprises a receiving unit, or module, for receiving a Channel State Information, CSI, report from the wireless device. The computer program further comprises a determining unit, or module, for determining a CQI offset based on (i) the obtained path gain information or (ii) the downlink received power, and the obtained load information, wherein the CQI offset is determined as the difference between a Signal to Interference and Noise Ratio, SINR for a data signal and an SINR for a CRS, and for determining the transmission parameter to be used for the transmission to the wireless device based on the reported CSI and determined CQI offset.

The computer program modules could essentially perform the actions of the flow illustrated in FIG. 2a, to emulate the serving network node. In other words, when the different computer program modules are executed in the processing unit 706, they may correspond to the units 503-505 of FIG. 5.

Although the code means in the respective embodiments disclosed above in conjunction with FIG. 2a are implemented as computer program modules which when executed in the respective processing unit causes the serving network node and the second wireless device respectively to perform the actions described above in the conjunction with figures mentioned above, at least one of the code means may in alternative embodiments be implemented at least partly as hardware circuits.

The processor may be a single Central Processing Unit, CPU, but could also comprise two or more processing units. For example, the processor may include general purpose microprocessors; instruction set processors and/or related chips sets and/or special purpose microprocessors such as Application Specific Integrated Circuits, ASICs. The processor may also comprise board memory for caching purposes. The computer program may be carried by a computer program product connected to the processor. The computer program product may comprise a computer readable medium on which the computer program is stored. For example, the computer program product may be a flash memory, a Random-Access Memory RAM, Read-Only Memory, ROM, or an EEPROM, and the computer program modules described above could in alternative embodiments be distributed on different computer program products in the form of memories within the serving network node.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method performed by a serving network node for determining a transmission parameter to be used for transmission to a wireless device, the method comprising:
    obtaining one of (i) path gain information relating to the wireless device and (ii) a downlink received power relating to Cell-specific Reference Signals (CRSs) transmitted by at least the serving network node;
    obtaining load information of network nodes that are potentially strong interferers to the wireless device, wherein the obtained load information indicates a respective average load of the respective network nodes that are potentially strong interferers to the wireless device;
    receiving a Channel State Information (CSI) report from the wireless device;
    determining a Channel Quality Indicator (CQI) offset based on one of (i) the obtained path gain information and (ii) the obtained downlink received power; and the obtained load information, the CQI offset being determined as the difference between a Signal to Interference and Noise Ratio (SINR) for a data signal and an SINR for a CRS; and
    determining the transmission parameter to be used for the transmission to the wireless device based on the reported CSI and the determined CQI offset.

2. The method according to claim 1, wherein obtaining the at least one of (i) the path gain information relating to the wireless device, and (ii) the downlink received power relating to the CRSs transmitted by at least the serving network node, comprises: receiving a Reference Signal Received Power (RSRP) report from the wireless device indicating both a set of network nodes, including the serving network node, whose downlink reference signal transmissions are received with powers above a threshold, as well as measured received power values relating to CRSs transmitted by the network nodes in the set; and based on information in the RSRP report, calculating respective path gains, associated with the network nodes in the set, for the wireless device, wherein the calculation of the respective path gains is based on the CRS transmit powers used by the respective network nodes in the set.

3. The method according to claim 2, further comprising determining a downlink received power relating to the wireless device, wherein the SINR for the data signal is determined as the downlink received power at the wireless device with regards to the CRSs transmitted by the serving network node divided by a sum of the respective downlink received powers at the wireless device with regards to the CRSs transmitted by the network nodes that are potentially strong interferers to the wireless device multiplied with the respective load indicators and CRS power boosting offsets of the network nodes.

4. The method according to claim 2, further comprising determining a downlink received power relating to the wireless device, wherein the SINR for the CRS is determined as the downlink received power at the wireless device with regards to the CRSs transmitted by the serving network node divided by a sum of the respective downlink received powers at the wireless device with regards to the CRSs transmitted by the network nodes being potentially strong interferers to the wireless device.

5. The method according to claim 1, wherein obtaining the path gain information relating to the wireless device comprises estimating a path gain to the wireless device based on a received power measured on an uplink Sounding Reference Signal (SRS) transmitted from the wireless device, and further comprises receiving, from the network nodes that are potentially strong interferers to the wireless device, received power measurements made in the respective network nodes on the transmitted uplink SRS.

6. The method according to claim 1, further comprising determining a downlink received power relating to the wireless device, wherein the SINR for the CRS is determined as the downlink received power at the wireless device with regards to the CRSs transmitted by the serving network node divided by a sum of the respective downlink received powers at the wireless device with regards to the CRSs transmitted by the network nodes being potentially strong interferers to the wireless device.

7. The method according to claim 1, further comprising determining a downlink received power relating to the wireless device, wherein the SINR for the data signal is determined as the downlink received power at the wireless device with regards to the CRSs transmitted by the serving network node divided by a sum of the respective downlink received powers at the wireless device with regards to the CRSs transmitted by the network nodes that are potentially strong interferers to the wireless device multiplied with the respective load indicators and CRS power boosting offsets of the network nodes.

8. The method according to claim 1, further comprising tuning the CQI offset with a correction factor.

9. The method according to claim 1, further comprising tuning the CQI offset by adding a rank-specific offset to the CQI offset.

10. A serving network node to determine a transmission parameter to be used for transmission to a wireless device, the serving network node being configured to:
obtain one of (i) path gain information relating to the wireless device and (ii) a downlink received power relating to Cell-specific Reference Signals (CRSs) transmitted by at least the serving network node;
obtain load information of network nodes that are potentially strong interferers to the wireless device, wherein the obtained load information indicates a respective average load of the respective network nodes that are potentially strong interferers to the wireless device;
receive a Channel State Information (CSI) report from the wireless device;
determine a Channel Quality Indicator (CQI) offset based on one of (i) the obtained path gain information and (ii) the obtained downlink received power; and the obtained load information, the CQI offset being determined as the difference between a Signal to Interference and Noise Ratio (SINR) for a data signal and an SINR for a CRS; and
determine the transmission parameter to be used for the transmission to the wireless device based on the reported CSI and the determined CQI offset.

11. The serving network node according to claim 10, wherein in order to obtain the at least one of (i) the path gain information relating to the wireless device, and (ii) the downlink received power relating to the CRSs transmitted by at least the serving network node, the serving network node is configured to: receive a Reference Signal Received Power (RSRP) report from the wireless device indicating both a set of network nodes, including the serving network node, whose downlink reference signal transmissions are received with powers above a threshold, as well as measured received power values relating to CRSs transmitted by the network nodes in the set; and based on information in the RSRP report, calculate respective path gains, associated with the network nodes in the set, for the wireless device, wherein the calculation of the respective path gains is based on the CRS transmit powers used by the respective network nodes in the set.

12. The serving network node according to claim 10, wherein in order to obtain the path gain information relating to the wireless device, the serving network node is configured to estimate a path gain to the wireless device based on a received power measured on an uplink Sounding Reference Signal (SRS) transmitted from wireless device, and the serving network node is further configured to receive, from the network nodes that are potentially strong interferers to the wireless device, received power measurements made in the respective network nodes on the transmitted uplink SRS.

13. The serving network node according to claim 10, wherein the serving network node is configured to determine a downlink received power relating to the wireless device, wherein the SINR for the CRS is determined as the downlink received power at the wireless device with regards to the CRSs transmitted by the serving network node divided by a sum of the respective downlink received powers at the wireless device with regards to the CRSs transmitted by the network nodes being potentially strong interferers to the wireless device.

14. The serving network node according to claim 10, wherein the serving network node is configured to determine a downlink received power relating to the wireless device, wherein the SINR for the data signal is determined as the downlink received power at the wireless device with regards to the CRSs transmitted by the serving network node divided by a sum of the respective downlink received powers at the wireless device with regards to the CRSs transmitted by the network nodes that are potentially strong interferers to the wireless device multiplied with the respective load indicators and CRS power boosting offsets of the network nodes.

15. The serving network node according to claim 10, being further configured to tune the CQI offset with a correction factor.

16. The serving network node according to claim 10, being further configured to tune the CQI offset by adding a rank-specific offset to the CQI offset.

17. A non-transitory computer storage medium storing an executable computer program which, when run in a processing unit in a serving network node for determining a transmission parameter to be used for transmission to a wireless device, causes the serving network node to perform a method comprising:

obtaining one of (i) path gain information relating to the wireless device and (ii) a downlink received power relating to Cell-specific Reference Signals (CRSs) transmitted by at least the serving network node;

obtaining load information of network nodes that are potentially strong interferers to the wireless device, wherein the obtained load information indicates a respective average load of the respective network nodes that are potentially strong interferers to the wireless device;

receiving a Channel State Information (CSI) report from the wireless device;

determining a Channel Quality Indicator (CQI) offset based on one of (i) the obtained path gain information and (ii) the obtained downlink received power; and the obtained load information, the CQI offset being determined as the difference between a Signal to Interference and Noise Ratio (SINR) for a data signal and an SINR for a CRS; and determining the transmission parameter to be used for the transmission to the wireless device based on the reported CSI and the determined CQI offset.

* * * * *